(12) United States Patent
Kalyanraman et al.

(10) Patent No.: US 10,197,693 B2
(45) Date of Patent: Feb. 5, 2019

(54) BARRIER EVALUATION SYSTEM AND METHOD

(71) Applicant: Schlumberger Technology Corporation, Sugar Land, TX (US)

(72) Inventors: Ram Sunder Kalyanraman, Richmond, TX (US); Bernard Georges Frignet, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 22 days.

(21) Appl. No.: 15/051,585

(22) Filed: Feb. 23, 2016

(65) Prior Publication Data

US 2016/0245946 A1    Aug. 25, 2016

Related U.S. Application Data

(60) Provisional application No. 62/120,769, filed on Feb. 25, 2015.

(51) Int. Cl.
| | | |
|---|---|---|
| *G01V 1/40* | (2006.01) | |
| *G01V 1/50* | (2006.01) | |
| *G01V 1/44* | (2006.01) | |
| *E21B 47/00* | (2012.01) | |
| *G01V 1/42* | (2006.01) | |

(52) U.S. Cl.
CPC ............ *G01V 1/50* (2013.01); *E21B 47/0005* (2013.01); *G01V 1/40* (2013.01); *G01V 1/42* (2013.01)

(58) Field of Classification Search
CPC ........ E21B 47/0005; G01V 1/40; G01V 1/44; G01V 1/50
USPC ............................................. 367/35; 181/105
See application file for complete search history.

(56) References Cited

U.S. PATENT DOCUMENTS

| | | | | |
|---|---|---|---|---|
| 4,953,137 | A | * 8/1990 | Medlin | E21B 49/006 367/31 |
| 5,036,496 | A | * 7/1991 | Rutledge | E21B 47/0005 181/105 |
| 6,041,861 | A | * 3/2000 | Mandal | E21B 47/0005 166/250.01 |

(Continued)

FOREIGN PATENT DOCUMENTS

WO    2014/186640    11/2014

*Primary Examiner* — Ian J Lobo
(74) *Attorney, Agent, or Firm* — Eileen Pape

(57) ABSTRACT

Methods and systems of barrier evaluation are disclosed. The method includes obtaining vibration measurement data measured in a wellbore having at least one casing. In addition, the method includes determining a boundary definition of the barrier between the casing and a formation, based on the vibration measurement data. Further, the method includes evaluating the barrier based on the one boundary definition. The system includes a vibration sensor located in the wellbore having at least one casing and a vibration source for generating vibrations. The system may also include a data logging system of producing vibration measurement data received with the vibration sensor and a processor for determining at least one boundary definition of barrier between the casing and a formation, based on the vibration measurement data and evaluating the barrier based on the at least one boundary definition.

20 Claims, 6 Drawing Sheets

(56) References Cited

U.S. PATENT DOCUMENTS

| | | | | |
|---|---|---|---|---|
| 6,173,606 B1* | 1/2001 | Mosley | ............... | E21B 47/0005 |
| | | | | 166/253.1 |
| 7,048,089 B2* | 5/2006 | West | ........................ | G01V 1/16 |
| | | | | 181/105 |
| 8,408,064 B2 | 4/2013 | Hartog et al. | | |
| 8,411,529 B2* | 4/2013 | Horne | ...................... | G01V 1/40 |
| | | | | 367/25 |
| 9,823,376 B2* | 11/2017 | Merciu | .................... | G01V 1/46 |
| 2003/0094281 A1* | 5/2003 | Tubel | ..................... | E21B 47/00 |
| | | | | 166/250.03 |
| 2003/0156494 A1* | 8/2003 | McDaniel | ................ | G01V 1/44 |
| | | | | 367/35 |
| 2010/0126718 A1* | 5/2010 | Lilley | ................. | E21B 47/0005 |
| | | | | 166/253.1 |
| 2011/0292763 A1* | 12/2011 | Coates | .................... | E21B 47/01 |
| | | | | 367/25 |
| 2013/0021874 A1 | 1/2013 | Hartog et al. | | |
| 2013/0313420 A1* | 11/2013 | Kwong | .................. | G01V 5/102 |
| | | | | 250/257 |
| 2013/0345983 A1* | 12/2013 | Guo | .................... | E21B 47/0005 |
| | | | | 702/8 |
| 2014/0338896 A1* | 11/2014 | McGarian | ........... | E21B 47/0005 |
| | | | | 166/250.08 |
| 2015/0198732 A1* | 7/2015 | Zeroug | ............... | E21B 47/0005 |
| | | | | 367/35 |
| 2015/0331134 A1* | 11/2015 | Haldorsen | ........... | E21B 47/0005 |
| | | | | 367/35 |
| 2016/0061021 A1* | 3/2016 | Shaposhnikov | .... | E21B 47/0005 |
| | | | | 367/35 |

\* cited by examiner

TIME →

← DEPTH

← DEPTH

BARRIER EVALUATION SYSTEM AND METHOD

CROSS-REFERENCE TO RELATED APPLICATIONS

This application is based upon and claims the benefit of the priority of U.S. Provisional Application Ser. No. 62/120,769 entitled "BARRIER EVALUATION SYSTEM AND METHOD" filed on Feb. 25, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

After a wellbore is drilled, a casing is often put in place to prevent the collapse of the wellbore and to facilitate aspects of completion and production. In these situations, the casing is cemented in order to seal an annulus between the casing and a formation there around. Determining integrity of the wellbore, or how well the cement has sealed the annulus, is a vitally important consideration for safety and efficient operations at a well site.

A sonic logging has been around since the 1960s and is well known to the oil field industry. An ultrasonic logging predates 1991. Both sonic and ultrasonic measurements are highly suitable and have been commonly used to facilitate the determination of acoustic impedance of the barrier material (for the purposes of discussion, the barrier material will be described as cement, but the disclosure should not be limited to the cement) in the annulus behind the casing. The acoustic impedance aids in providing an assessment of the hydraulic isolation produced by the barrier. Typically, the cement behind the first casing (in the 1st annulus) is the only barrier evaluated. The known techniques do not allow or otherwise prevent a robust evaluation of the barrier such as cement behind the 2nd (or more) casing.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method of evaluating barrier in a wellbore comprises obtaining vibration measurement data measured in a wellbore having at least one casing; determining at least one boundary definition of barrier between the casing and a formation, based on the vibration measurement data; and evaluating the barrier based on the at least one boundary definition. In the method of the disclosure herein, the at least one boundary definition may comprise a reflection-based boundary definition and a data-attribute-driven boundary definition.

The method may further comprise obtaining at least one of schematic information on the wellbore, lithology information of the formation and a wireline log data measured with sonic or ultrasonic measurements measured for the borehole. The at least one boundary definition may be determined based on the vibration measurement data, and the at least one of the schematic information, the lithology information and the wireline log data.

In addition, the method may comprise obtaining source location information on two or more vibration sources. The boundary definition may be determined based on the vibration measurement data and the source location information. The source location information may also include a well-head position, a short-distance position close to the well-head and a medium-distance position away from the well-head position. The vibration measurement data may be borehole seismic data measured in the wellbore, and the at least one boundary definition may be determined based on the borehole seismic data. The borehole seismic data may also comprise at least one of borehole seismic events and attributes of seismic measurements in the wellbore.

In the method, the borehole seismic data may be obtained with respect to the wellbore having two or more casings and the reflection-based boundary definition may be determined for an annulus behind each of the two or more casing. Further, the borehole seismic data may be obtained with respect to the wellbore having two or more casings, and the reflection-based boundary definition may be determined for an annulus behind each of the two or more casing.

In another aspect of the present disclosures, a system of evaluating barrier in a wellbore comprises a vibration sensor located in a wellbore having at least one casing; a vibration source of generating vibrations received with the vibration sensor; a data logging system of producing vibration measurement data received with the vibration sensor and a processor of determining at least one boundary definition of barrier between the casing and a formation, based on the vibration measurement data and evaluating the barrier based on the at least one boundary definition.

The vibration sensor may comprise a distributed vibration sensor (DVS), an array of receivers or a fiber optic cable. The vibration sensor may be located in the barrier. The vibration sensor may be permanently installed in the wellbore. The vibration sensor may be conveyed in the borehole by a wireline, a drill pipe or a tubing.

Further, the vibration source may be located at at least one of a well-head position, a short-distance position close to the well-head and a medium-distance position away from the well-head position, and the processor may determine based on the vibration measurement data and source location information on two or more vibration sources. The vibration source may be located at the ground surface.

In addition, the at least one boundary definition may comprise a reflection-based boundary definition and a data-attribute-driven boundary definition. The processor may also determine the at least one boundary definition based on the vibration measurement data, and at least one of schematic information on the wellbore, lithology information of the formation and a wireline log data measured with sonic or ultrasonic measurements measured for the borehole.

Further still, the vibration measurement data may be borehole seismic data measured in the wellbore and the at least one boundary definition may be determined based on the borehole seismic data. The borehole seismic data may comprise at least one of borehole seismic events and attributes of seismic measurements in the wellbore.

In the method and system disclosed herein, the vibration measurement data may be measured in the wellbore having two or more casings and the at least one boundary definition may be determined for annular barrier behind each of the two or more casings. The barrier may comprise cement.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Figure 1:
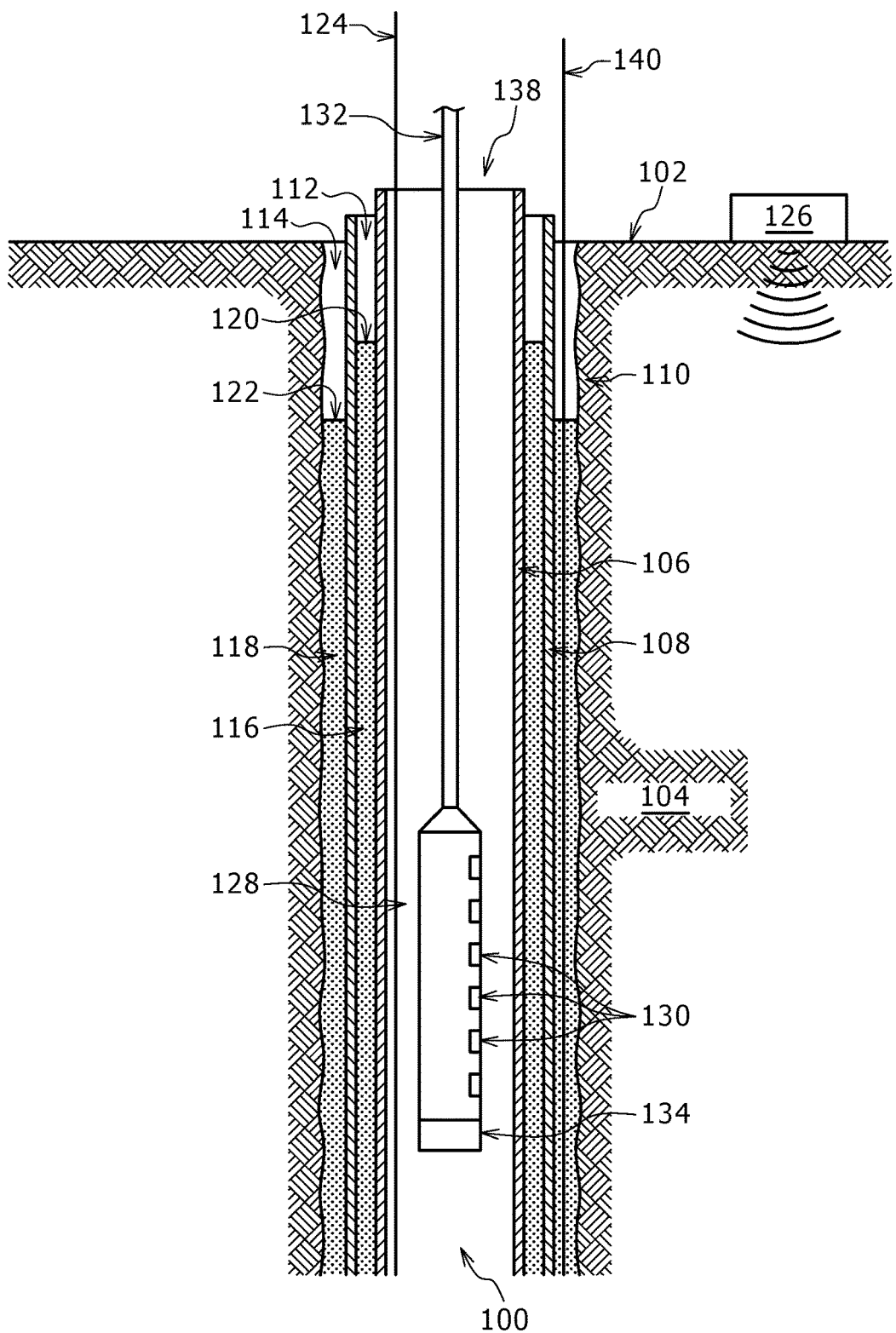
FIG. 1 is a schematic illustration of a downhole seismic system shown with a number of optional implementations, according to embodiments of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The sensing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Well Integrity cement logging allows the determination of the acoustic impedance of the material in the annulus behind the casing and thus aid in the assessment of the hydraulic isolation. For this purpose sonic and ultrasonic measurements are highly suitable and commonly used to evaluate cement behind the first casing (in the 1st annulus). However this technique prevents the robust evaluation of barrier such as cement behind the 2nd (or more) casing.

Various embodiments incorporating the methods and techniques of this disclosure follow an integrated approach using conventional sonic, ultrasonic and borehole seismic to enable the evaluation of cement in the 1st annulus as well as the behind the 2nd annulus and beyond.

Embodiments of the system and methodology may include the use of various techniques in isolation or in combination, such as a data driven approach using borehole seismic data and using borehole seismic events and attributes to identify the presence or absence of barriers or restrictions in the annulus behind casings. The data driven approach may use direct & reflected casing conveyed waves, direct & reflected formation events, direct & reflected tube waves, and seismic attributes such as amplitude, frequency, phase. In addition, other embodiments may use conventional sonic and ultrasonic logs, a priori knowledge of well construction and well schematics, and lithology information.

Some embodiments of the system and methodology may also be used to evaluate cement behind first casing (1st annulus) using borehole seismic data using a definition criteria for identifying boundaries and/or cement behind 2 casings (2nd or 3rd annulus or more) using borehole seismic data using a definition criteria for identifying boundaries. In addition, embodiments may be used to improve confidence to cement evaluation behind 2 casings (or more) using borehole seismic data and conventional sonic/ultrasonic data.

Embodiments of the proposed methodology can be carried out with borehole seismic data acquired through many methods, sensors, and systems, and should not be limited to only those systems disclosed herein. For example, but not limited to, borehole seismic data may be acquired through:

- Conventional wireline conveyed borehole seismic data using a single or multi-array geophone/hydrophone/MEMS (Micro-Electro-Mechanical Systems),
- A fiber optic distributed acoustic system either placed permanently in the annulus or with fiber optic cable run specially inside casing for the measurement, or
- Seismic while drilling data.

Embodiments of the methodology may also integrate some of the characteristics of tube waves in diagnosing the presence of cement in multiple annuli. Tube waves are well understood phenomenon that can be generated when formation waves incident on the borehole or by surface waves. For example, see commonly assigned applications detailing Distributed Acoustic Wave Detection (to Hartog et al., filed 4 Nov. 2009 and granted on 2 Apr. 2013 as U.S. Pat. No. 8,408,064) and Methods for Locating A Cement Sheath in a Cased Wellbore (to Hartog et. al., filed 19 Sep. 2012 as U.S. patent application Ser. No. 13/623,076, US Patent Application Publication No. 2013-0021874), both of which are incorporated herein by reference in their entirety for all intents and purposes. An interface wave may occur in cased wellbores when a Rayleigh wave encounters a wellbore and perturbs the fluid within.

The tube wave travels down the wellbore along the interface between the fluid in the wellbore and the wall of the wellbore. Tube waves suffer little energy loss and typically retain a relatively high amplitude which interferes with reflected arrivals occurring later in time on vertical seismic profile (VSP) data.

Because the tube wave is coupled to the formation through which it is traveling, the tube wave can perturb the formation across open fractures intersecting the borehole. This squeezing effect can generate secondary tube waves which travel both up and down from the fracture location. Such events can provide a diagnosis of the presence of open fractures and their amplitude related qualitatively to the length and width, e.g., volume of the fluid-filled fracture space. However, this effect is generally seen only in shallow formations where the overburden pressure is lower.

Borehole seismic data acquired with a multiple station measurements or through a distributed fiber optic (FO) cable include by virtue of the nature of wave propagation from surface to sub-surface information on wave travel through various paths, such as:

a) Wave propagation through the steel casing in the well;
b) Wave propagation through the formation; and
c) Wave propagation through tube waves in the fluid filled space inside the steel casing and in its annulus.

Depending on the material behind the casing(s), the acoustic coupling to the formation is affected and the various modes are propagated at different intensities and attributes as the acoustic wave arrives at the array of receivers.

For a good quality signal of wave propagation through the formation, the array of receivers should be well coupled through the steel casing and annulus through to the formation. The array is well coupled when the casing is well cemented to the formation. If an annulus of the casing is un-cemented or contains voids or bridges, then a significant drop in the amplitude or energy of the formation arrival can be expected, depending at least in part on how many annuli is/are un-cemented or what portion of the annuli contain low quality coupling to the formation or other annuli, such as voids, etc. Investigating the behavior of the strength of the formation arrival in isolation or in combination with other information can help identify the presence of cement or the position of the top of cement (TOC) in the 1st annulus or behind the 2nd or more casing.

As disclosed in the Application Publication 2013-0021874, energy from the surface may be guided through the steel casing walls and will travel largely un-attenuated in un-cemented sections or be attenuated against cemented sections. The tube wave travels down the wellbore along the interface between the fluid in the wellbore and the wall of the wellbore. Tube wave in general suffer little energy loss and typically retain a very high amplitude. Because the tube wave is coupled to the surrounding formation through which it is traveling, it can perturb or otherwise affect the formation.

This squeezing effect can generate secondary tube waves that travel both up and down from any obstructions or restrictions encountered in the annulus, such as those associated with well construction elements. These tube waves can be diagnostic of or related to aspects such as borehole size, completion elements or the presence or absence of cement in the various annuli of casing(s). Annulus barriers such as cement and associated tops of cement may be deciphered using the presence and absence of tube waves, their respective origins and points of reflection. In order to simplify further description, annulus barriers will be referred to as cement or cement casings, but embodiments of this disclosure may not be limited to only this type of barrier and may be applied to other appropriate barriers as known in the art.

Referring in general to FIG. 1, an embodiment of a system to evaluate annulus barriers such as cement is shown in the partial schematic representation of portions of a cased wellbore. In the figure, a wellbore 100 extends below the surface 102 of the earth through a formation 104 of interest. This surface 102 may be dry land or sub-sea. Two casings 106,108 are shown as being installed and cemented into the wellbore 100 for the purpose of simplifying the drawing, in practice three or more casings may also be used and cemented into the wellbore 100.

The first casing 106 is surrounded by the second casing 108, and the casing 108 is further surrounded by the borehole wall 110 of the wellbore 100. Due to differences in size as well as irregular surfaces, an annulus 112 is created between the casing 106 and the casing 108, and another annulus 114 is created between the casing 108 ant the borehole wall 110. The casings 106, 108 are cemented into the wellbore 100 with cement 116 located in the annulus 112 and cement 118 located in the annulus 114.

The cement 116 and cement 118 fix the casing 106 and casing 108 within the wellbore 100 and function to seal the annulus 112 and annulus 114. The cement 116 and cement 118 each respectively have a top of cement (TOC) 120 and a top of cement (TOC) 122. As stated earlier, embodiments of this disclosure may be used to check on the integrity of the cement 116 and cement 118 barriers as well as locate the TOC 120 and TOC 122.

A few representative examples of embodiments of the disclosure are shown in the figure. In one option, a distributed vibration sensor (DVS) such as a fiber optic cable 124 may be extended within the casing 106 in order to detect vibrations emitted by a source (vibration source) 126 located on the surface 102. In another option, a tool 128 comprising a downhole array of multiple receivers 130 or a DVS may be provided within the casing 106 either by using a tubing/cable 132 such as a wireline (WL), coil tubing, drill pipe, MWD (measurement while drilling) or LWD (logging while drilling). The tool 128 may have a source (vibration source) 134 used to create acoustic, sonic, seismic or ultra-seismic signals.

Figure 2:
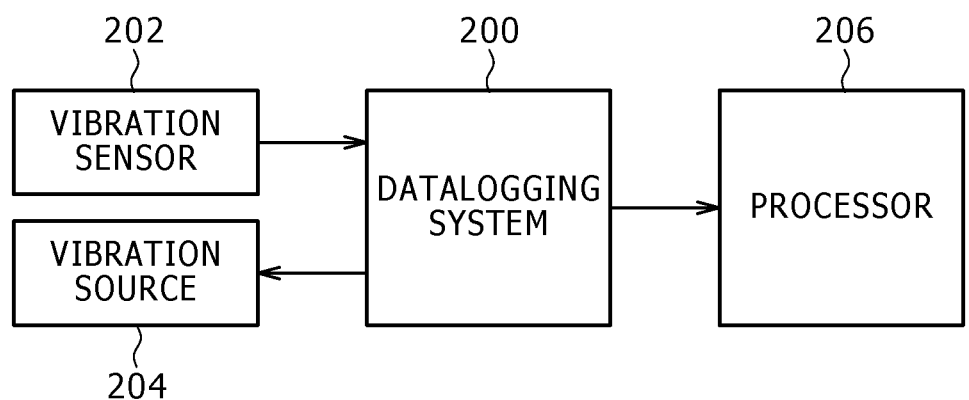
FIG. 2 shows a schematic block diagram of a barrier evaluation system, according to embodiments of the disclosure.

Referring to FIG. 2, the system to evaluate annulus barriers such as cement may comprise a data logging system 200, a vibration sensor 202 located in the wellbore having the casings, a vibration source 204 of generating vibrations to be received with the vibration sensor 202, and a processor 206 such as a computer apparatus. For example, the data logging system 200 may comprise the foregoing tool 128 and tubing/cable 132. The vibration sensor 202 such as the downhole array of multiple receivers 130 or the DVS may be installed in the foregoing tool 128 and coupled with the data logging system 200 via the tubing/cable 132. The vibration source 204 such as the foregoing source 126 or 134 may be coupled with the data logging system 200 so that the generation of vibrations can be controlled.

The detected vibrations with the downhole array of multiple receivers 130 or the DVS may be transmitted to the data logging system 200 via the tubing/cable 132 and the data logging system 200 may produce a data log of vibrations received at the downhole array of multiple receivers 130 or the DVS. The processor 206 may be coupled with the data logging system 200 via a cable or a network so as to be received the data log from the data logging system 200. The data log may be transferred from the data logging system 200 to the processor 206 via a storage medium such as a USB memory, a memory card, a magnetic tape or disk, an optical disk, etc.

The processor 146 may be also installed within the data logging system 140. Using the processor 206, the vibration data log may be evaluated with respect to a reflection-based boundary definition and a data-attribute-driven boundary definition for the annulus (barrier) of cement between the casing and the formation to determine the presence of cement in the annulus.

In still another embodiment of the disclosure, an embedded DVS such as a fiber optic cable 136 may be used as a permanent sensor provided in one of the annuli and cemented or packed in place. In yet another embodiment, a permanent conduit for a DVS such as a fiber optic cable 124 may be placed in an annuli of the wellbore and casings and the sensor removably installed within the conduit.

As discussed earlier, a source may be located downhole in a tool, such as the source 134 in the downhole array tool 128 shown in FIG. 1. However, a source may also be located on the surface 102 such as the source 126 in FIG. 1 or in some cases, such as offshore, in the ocean above the sea-bed. The source may be used to produce various waves that are able to be received by the DVS located downhole in the wellbore. In some cases, the source may be used to create acoustic, sonic, seismic or ultra-seismic signals.

Figure 3:
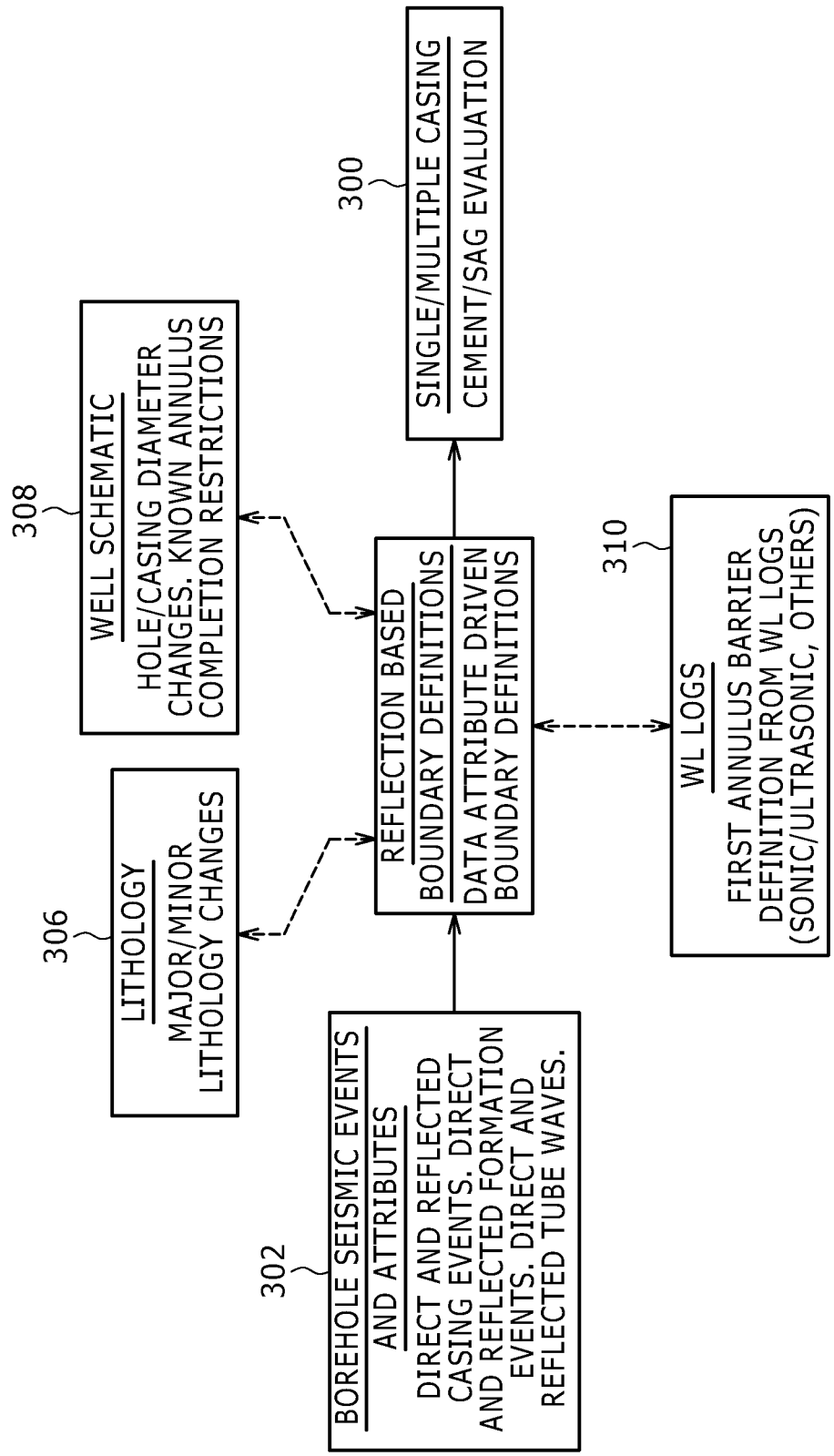
FIG. 3 shows a flowchart representing boundary definition criteria, according to embodiments of the disclosure.

Referring generally to FIG. 3, a flowchart describes various aspects of some embodiments of the current disclosure. As an initial step, specific criteria are identified for definitions of boundaries in the annuli associated with cement or mud sags. The criteria use seismic attributes associated with casing. For example, formation arrivals as well as tube waves are affected by the presence or absence of good acoustic coupling (as may be associated with the presence of cement in the annuli). In addition, the presence and behavior of direct and reflected events of casing, tube and formation arrivals in the entire recorded waveform relates to the presence of acoustic boundaries such as the presence of cement in the annuli.

Other criteria include a priori information such as information related to well schematics that may help rule out well construction aspects that can cause reflections (borehole size, completion elements or lithology related events) or trap reflections. Another consideration is the fact how surface sources at different spatial distances from the well head can lead to stronger or weaker influence of various modes discussed above and also lead to higher or lower sensitivity to cement behind the 1st or multiple annuli. Late time events (especially unique signatures that are associated/confined to a range of depth) can be investigated with the VSP survey that may hold information on variations to well boundaries associated with cement tops in single or multiple annuli. Also, similar measurements may be repeated with source positions at a well-head, close to well head and spaced away from well-heads at varying distances to facilitate one mode over the other.

As a result of these considerations, embodiments of the methodology may include a set of criteria for reflection-based boundary definitions i.e., recognizing directed and reflected events and associating them to acoustic boundaries and a set of criteria based on seismic attribute thresholding and clustering (amplitudes, phase, frequency) i.e., attribute driven behaviors that can be used for recognizing intervals and change point associated with boundaries. Since many reasons can cause changes in data behavior and reflections it is important to identify and associate lithology related, hole/casing related or completion related factors that will cause reflections.

Embodiments of the methodology may also include data attribute (amplitude, phase, frequency) changes in between boundaries and reflection sequences not associated with boundaries previously identified, that are attributed to the presence or absence of acoustic boundaries caused by cement or barite sags in the annuli. The presence of sonic, ultrasonic or other wireline logs can further clarify the presence or absence of cement or barite sags in the 1st annulus. This information, when integrated with borehole seismic data, can further enhance the ability to evaluate the presence or absence of cement behind multiple casing.

In some embodiments, as shown in FIG. 3, in order to produce single/multiple casing cement/sag evaluation 300, borehole seismic events and attributes 302, such as direct and reflected casing events, direct and reflected formation events, and direct and reflected tube waves are considered in view of reflection-based boundary definitions and data-attribute-driven boundary definitions 304. Feeding into the boundary definitions are lithology 306, both major and minor lithology changes, well schematics 308, including hole/casing diameter changes and known annulus completion restrictions, for example, and also data logs 310, such as determining the 1st annulus barrier definition from the data logs (i.e., acoustic, sonic, seismic, ultrasonic and others).

Figure 4:
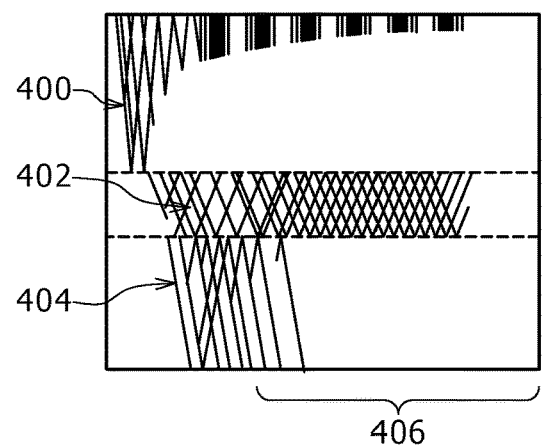
FIG. 4 is a simplified graphical representation of a received seismic signal plotted in time vs. depth and showing the general position of various aspects of the signal and the general position of late events.

With regards to exemplary FIG. 4, this figure shows a graph of time vs. depth of a simplified version of a data log in which the general areas of interpretation are identified. The top section of the data log shows the casing arrival and reflections 400. The middle part of the data log shows the tube waves and their reflections 402 while the lower portion of the log is formation arrivals and reflections 404. In addition, the right hand half of the graph can be classified as late events behavior 406.

Figure 5:
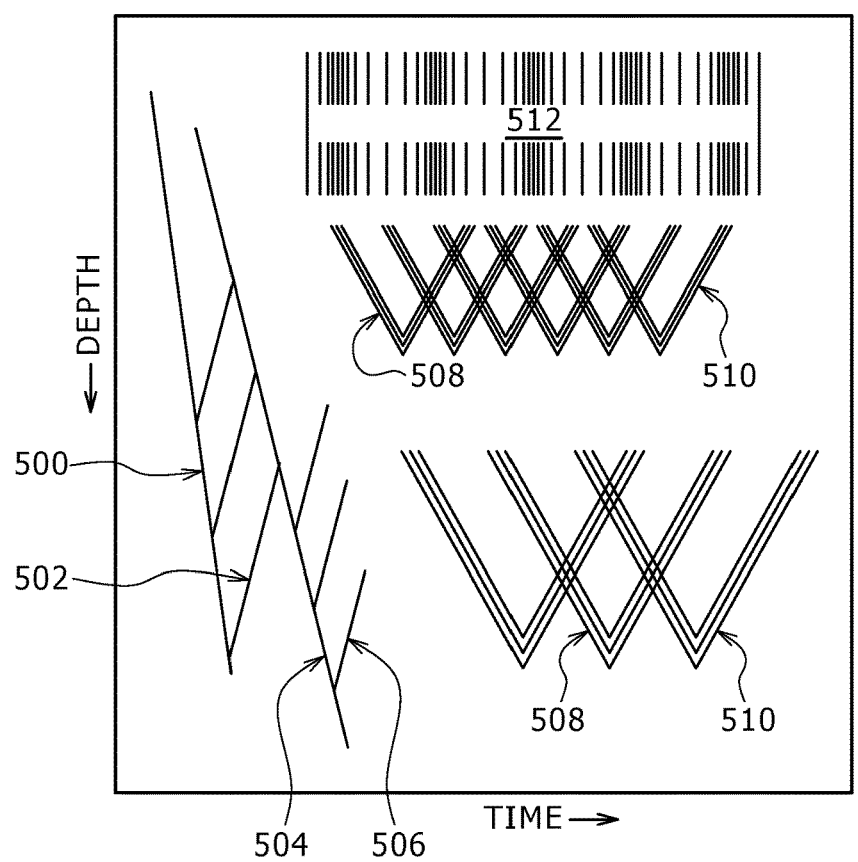
FIG. 5 is an even more simplified graphical representation of a received seismic signal plotted in time vs. depth and showing some of the components of the individual wave forms.

FIG. 5 shows a more stylized version of the graph of FIG. 4 in which the individual components of some of the waves are identified. For example, both the casing event 500 and casing reflection 502 as well as the formation direct (down going) arrival 504 and formation reflection 506 are identified on the graph. Two sets of tube waves (down going) 508 and tube waves (reflected) 510 are also identified. Tow frequency reverberations 512 are also shown at the upper portion of the graph.

Figure 6:
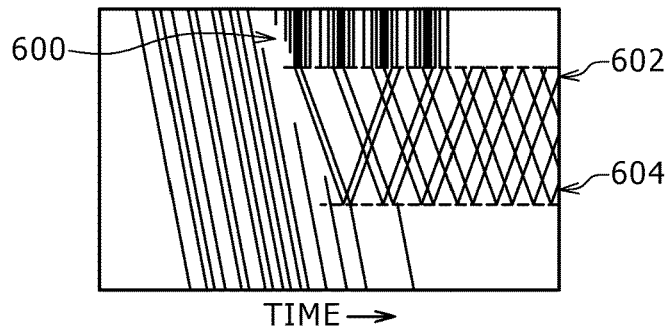
FIG. 6 is a simplified graphical representation of a received seismic signal plotted in time vs. depth and showing the start of a strong down going tube wave and the end of a strong up going tube wave, and the reflection point of the strong down going tube wave and the start of the strong up going tube wave.
Figure 7:
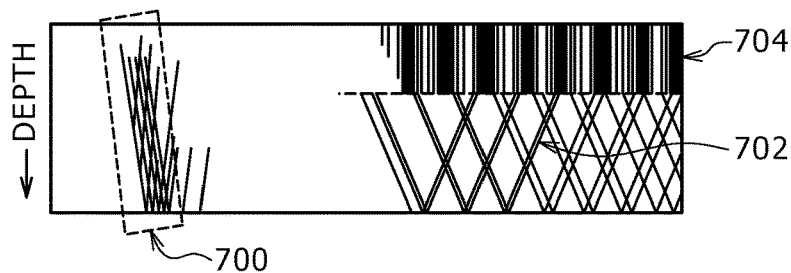
FIG. 7 is a simplified graphical representation of a received seismic signal plotted in time vs. depth and showing persistent low frequency reverberation and formation arrival strength varying with depth.
Figure 8:
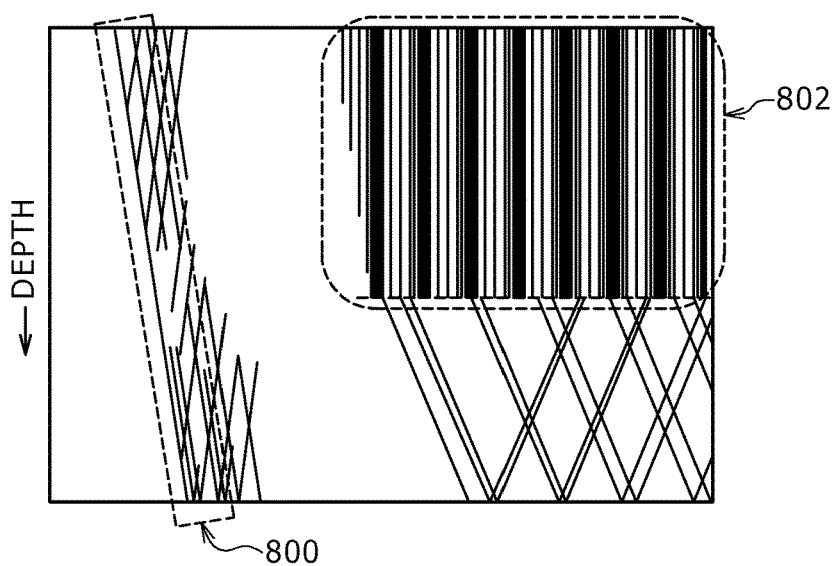
FIG. 8 is another simplified graphical representation of a received seismic signal plotted in time vs. depth and showing persistent low frequency reverberation and formation arrival strength varying with depth.

FIGS. 6-8 show different portions of FIG. 4 with various areas highlighted and components identified. In FIG. 6, the persistent low frequency reverberations (vertical stripes in time) 600 are shown at the top of the graph. In addition, the start of strong down going tube waves 602 and the end of strong up going tube waves 604 are identified with an upper dashed line and the reflection point of strong down going tube waves and start of the strong up going reflected waves are indicated by a lower dashed line. FIG. 7 shows how the formation arrival strength may vary along with depth, increasing as the depth increases. The persistent low frequency reverberations (vertical stripes in time) 702 and the down going and reflected tube wave 704 are also shown in FIG. 7. FIG. 8 shows the formation arrival strength 800 varying along with depth and associated with reflections. The persistent low frequency reverberations (vertical stripes in time) 802 are also shown in FIG. 8.

Figure 9:
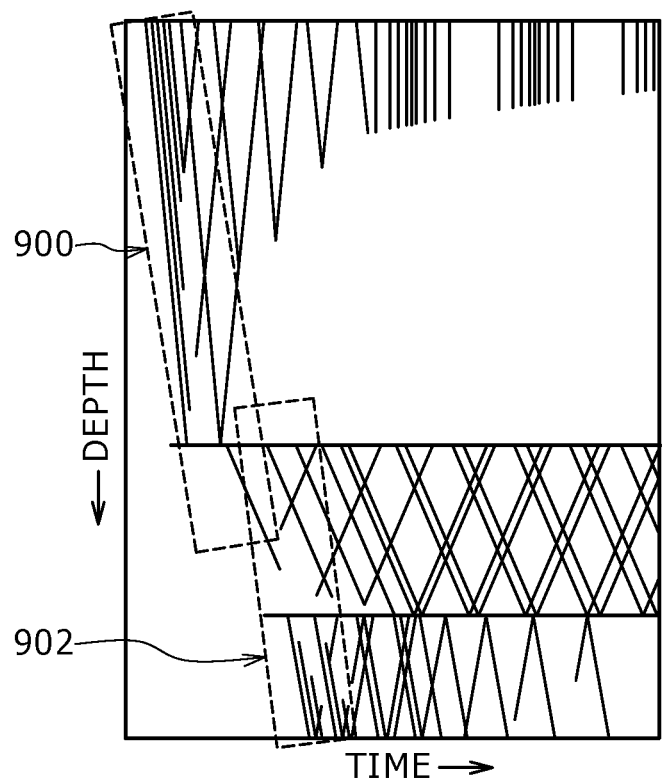
FIG. 9 is a simplified graphical representation of a received seismic signal plotted in time vs. depth and showing casing arrival strength varying with depth and associated with reflections.

Finally, FIG. 9 identifies two regions on the graph of the data log. The upper dashed rectangle shows casing arrival strength 900 varying with depth and associated with reflections, increasing as the depth decreases. The lower dashed rectangle shows the formation arrival strength 902 varying with depth, as stated with FIG. 8, increasing as depth increases.

Based on these data attributes and reflection sequences, a set of guidelines can be established and developed to evaluate the top of annulus barriers (cements) in single string annulus or multiple string annuli. The criteria will be split into three general categories based on the location of the source. The locations are a well head source, a short distance source, and a medium distance source. For general approximation and not as a limitation, short distance may approximately be less than 50 m from the well head, while medium distance could approximate the range of 50 m to 250 m. Large distances are generally greater than 250 m. Each of these categories will be discussed in turn.

Referring to FIG. 1 again, for a well head source 126 (i.e., a signal source located at or near the well head 138) and a quiet late half of the signal at all depth, there is no cement indicated in the annulus 112 and 114 in an interval in which there is the presence of strong casing arrival, no formation arrival, and a weak tube wave against the interval. The annulus 112 may have no cement and the annulus 2 to may indicate cement when there is weak or no casing arrival and relatively weak formation arrival. In addition, the TOC 122 (top of the cement 118 in the annulus 114) may be associated with the start of a strong down going tube wave and the end of strong up going tube wave and reflection of casing arrival, while TOC 120 (top of the cement 116 in the annulus 112) may be associate with the reflection of a strong down going tube wave into a strong up going tube wave and the reflection of a strong down going formation wave into an up going formation wave. The annulus 112 and 114 may both indicate cement when there is a strong formation arrival, no tube wave, and quiet behavior post-formation arrival.

For a short distance source, the annulus 112 and 114 may indicate no cement when the late half of the signal is busy in sections of the uncemented interval, there is weak presence of casing arrival, no formation arrival, a strong tube wave, and persistent late time low frequency reverberations (vertical stripes). The annulus 112 may indicate no cement and the annulus 114 may indicate cement when there is weak or no casing arrival and relatively weak formation arrival. The TOC 122 may be associated with the start of a strong down going tube wave and the end of a strong up going tube wave, the reflection of casing arrival, and persistent late time low frequency reverberation (vertical stripes). The TOC 120 may be associated with reflection of strong down going tube wave into a strong up going tube wave and the reflection of a strong down going formation wave into and up going formation wave. The annulus 112 and 114 may both indicate cement when there is strong formation arrival, no tube wave, and quiet behavior post-formation arrival.

When using a medium distance source, the annulus 112 and 114 may indicate no cement when the late half of the signal is busy in sections of uncemented interval, weak presences of casing arrival, no formation arrival, strong tube waves, and persistent late time low frequency reverberations (vertical stripes). The annulus 112 may indicate no cement and the annulus 114 may indicate cement when there is weak or no casing arrival and relatively weak formation arrival. The TOC 122 may be associated with the start of a strong down going tube wave and the end of a strong up going tube wave, reflection of casing arrival, and persistent low frequency reverberation (vertical stripes). The TOC 120 may be associated with the reflection of a strong down going tube wave into a strong up going tube wave, reflection of a strong down going formation wave into an up going formation wave, and repeated formation reflections in time. The annulus 112 and 114 may indicate cement when there is strong formation arrival, no tube wave, and quiet behavior post-formation arrival.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, comparatively less expensive materials can be modified to exhibit required properties of strength and corrosion resistance sufficient to either equal or exceed current requirements for service. The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method of evaluating one or more barriers in a wellbore, comprising:
obtaining vibration measurement data measured in a wellbore having at least two casings and at least two barriers wherein at least one of the barriers is between at least two of the casings and at least one of the barriers is between at least one of the casings and a formation and, wherein the vibration measurement data comprise at least two of casing arrival data, formation arrival data and tube wave data;
based at least in part on the vibration measurement data, associating reflection-based boundary definitions with material boundaries of the wellbore and recognizing at least one change point for material boundaries of the wellbore using seismic attribute driven boundary definitions; and
evaluating at least one of the barriers of the wellbore based at least in part on the recognizing at least one change point for material boundaries of the wellbore.

2. The method according to claim 1, further comprising obtaining at least one of schematic information on the wellbore, lithology information of the formation and a wireline log data measured with sonic or ultrasonic measurements measured for the borehole; and wherein at least one of the boundary definitions is determined based on the vibration measurement data, and the at least one of the schematic information, the lithology information and the wireline log data.

3. The method according to claim 1, further comprising obtaining source location information on two or more vibration sources; and wherein at least one of the boundary definitions is determined based on the vibration measurement data and the source location information.

4. The method according to claim 3, wherein the source location information includes a well-head position, a short-distance position close to the well-head and a medium-distance position away from the well-head position.

5. The method according to claim 1, wherein the vibration measurement data comprise borehole seismic data measured in the wellbore, and wherein the at least one of the boundary definitions is determined based on the borehole seismic data.

6. The method according to claim 5, wherein the borehole seismic data comprises at least one of borehole seismic events and attributes of seismic measurements in the wellbore.

7. The method according to claim 1, wherein the vibration measurement data are measured in the wellbore; and wherein at least one of the boundary definitions is determined for an annular barrier behind at least one of the at least two casings.

8. The method according to claim 1, wherein at least one of the barriers comprises cement.

9. The method of claim 1 wherein the evaluating comprises identifying a sag based on a recognized change point for material boundaries of the wellbore.

10. A system of evaluating one or more barriers in a wellbore, comprising:
a vibration sensor located in a wellbore having at least two casings and at least two barriers wherein at least one of the barriers is between at least two of the casings and at least one of the barriers is between at least one of the casings and a formation;
a vibration source of generating vibrations to be received with the vibration sensor;
a data logging system of producing vibration measurement data received with the vibration sensor, wherein the vibration measurement data comprise at least two of casing arrival data, formation arrival data and tube wave data; and
a processor of, based at least in part on the vibration measurement data, associating reflection-based boundary definitions with material boundaries of the wellbore and recognizing at least one change point for material boundaries of the wellbore using seismic attribute driven boundary definitions and evaluating at least one of the barriers of the wellbore based at least in part on the recognizing at least one change point for material boundaries of the wellbore.

11. The system according to claim 10, wherein the vibration sensor comprises a distributed vibration sensor (DVS) or an array of receivers.

12. The system according to claim 10, wherein the vibration sensor is located in at least one of the following; one of the barriers, permanently installed in the wellbore, or at the ground surface.

13. The system according to claim 10, wherein the vibration sensor is conveyed in the borehole by a wireline, a drill pipe or a tubing.

14. The system according to claim 10, wherein the vibration source is located at at least one of a well-head position, a short-distance position close to the well-head and a medium-distance position away from the well-head position, and wherein the processor determines based on the vibration measurement data and source location information on two or more vibration sources.

15. The system according to claim 10, wherein the processor determines at least one of the boundary definitions based on the vibration measurement data, and at least one of schematic information on the wellbore, lithology information of the formation and a wireline log data measured with sonic or ultrasonic measurements measured for the borehole.

16. The system according to claim 10, wherein the vibration measurement data comprise borehole seismic data measured in the wellbore, and wherein at least one of the boundary definitions is determined based on the borehole seismic data.

17. The system according to claim 16, wherein the borehole seismic data comprises at least one of borehole seismic events and attributes of seismic measurements in the wellbore.

18. The system according to claim 10, wherein the vibration measurement data are measured in the wellbore; and wherein at least one of the boundary definitions is determined for an annular barrier behind at least one of the at least two casings.

19. The system according to claim 10, wherein at least one of the barriers comprises cement.

20. The system of claim 10 wherein the evaluating comprises identifying a sag based on a recognized change point for material boundaries of the wellbore.

* * * * *